United States Patent [19]

Brust

[11] 4,313,701
[45] Feb. 2, 1982

[54] REMOVABLE CONTAINER GIMBALS MOUNTING ON A TRANSPORTING CAR CONTAINER

[75] Inventor: Gerhard Brust, Berlin, Fed. Rep. of Germany

[73] Assignee: Siemens Aktiengesellschaft, Berlin & Munich, Fed. Rep. of Germany

[21] Appl. No.: 63,935

[22] Filed: Aug. 6, 1979

[30] Foreign Application Priority Data

Aug. 10, 1978 [DE] Fed. Rep. of Germany ... 7824049[U]

[51] Int. Cl.³ .......................... B60P 1/64; B65J 1/20; B65J 1/22; B65J 1/02
[52] U.S. Cl. .................................... 410/52; 248/141; 266/276; 280/47.26; 298/2; 298/8 R; 410/2; 410/51; 410/77; 410/90
[58] Field of Search ............... 105/270; 248/137, 141, 248/142; 266/165, 276; 280/47.26, 33.99 F, 33.99 H, 33.99 T; 298/1 A, 2, 5, 8 R, 8 H; 308/2 R, 21, 34; 410/51, 52, 66, 68, 77, 90, 2

[56] References Cited

U.S. PATENT DOCUMENTS

| | | | |
|---|---|---|---|
| 824,253 | 6/1906 | Long | 298/8 R |
| 1,103,429 | 7/1914 | Pitkin | 280/47.26 X |
| 1,650,249 | 11/1927 | Venable | 298/8 R |
| 1,689,448 | 10/1928 | Moynahan | 280/47.26 |
| 2,475,278 | 7/1949 | Coakley | 298/2 X |

Primary Examiner—Joseph F. Peters, Jr.
Assistant Examiner—Howard Beltran
Attorney, Agent, or Firm—Hill, Van Santen, Steadman, Chiara & Simpson

[57] ABSTRACT

In an exemplary embodiment, a U-shaped bracket forms pivot pins by means of the bent-out end areas of the bracket arms, which pivot pins are insertable (and held by the resilience of the bracket) in recesses of the car container sidewalls. The U-shaped bracket has its respective arms engaging in lateral slots of the container insert. The removable container insert may be lowered into engagement with the U-shaped bracket after assembly of the bracket with the car container, with the dimensioning such that the container insert prevents disengagement of the retaining pins. Outwardly inclined parts of the bracket arms may engage in close fitting elongated slots of the container insert so that the container insert pivots as a unit with the supporting bracket.

7 Claims, 3 Drawing Figures

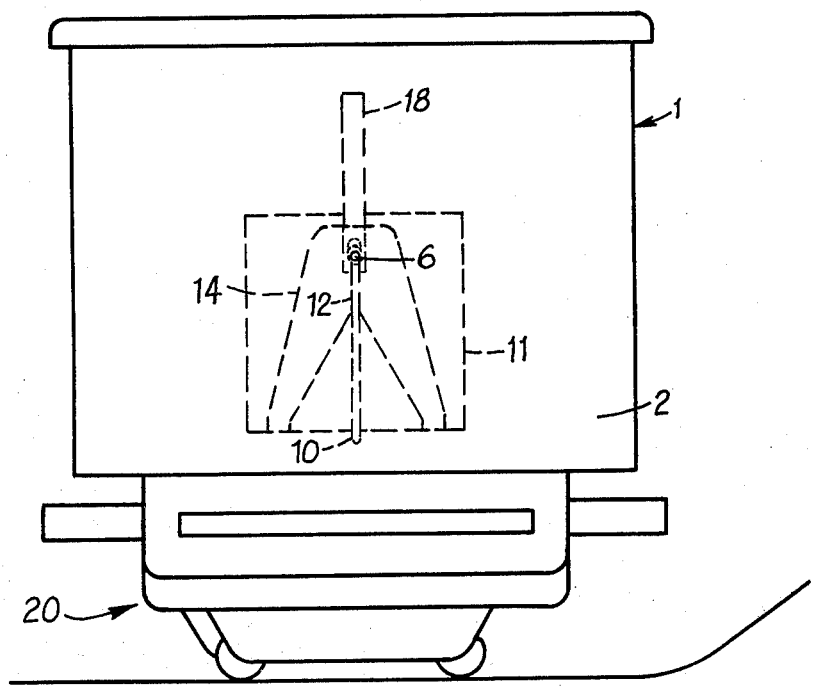

4,313,701

REMOVABLE CONTAINER GIMBALS MOUNTING ON A TRANSPORTING CAR CONTAINER

BACKGROUND OF THE INVENTION

The innovation relates to a transport car container with a removable container insert which is mounted for rotation about an axis defined by means of two mounting locations situated at limiting walls of the transport car container lying opposite one another.

The rotatable mounting of the removable container insert serves to maintain the container insert in the same upright position independent of the respective position (i.e. angular attitude) of the transport car container. The changeable car position and, thus, the change of the position of the transport car container generally stems from the fact that profile rails on which the transport car is guided not only proceed in a horizontal plane but also in planes inclined thereto, particularly in the vertical plane; beyond that, there also occur partial sections in which the transport car travels below the profile rail, i.e., in a hanging position. Removable, rotatable container inserts are particularly employed for the transport of liquids in test tubes; on the one hand, one need thereby not close the test tubes, on the other hand certain liquids in laboratory operation are to be protected against shaking.

As a rotating seating, the known transport car container provides two rigidly built-in pivot pins projecting into the interior space of the transport car container by which pivot pins the container insert is suspended with the use of corresponding recesses. Since the transport car container is generally not permanently allocated to a specific transport task, i.e., can optionally travel with a container insert but also without a container insert in order to receive other types of transport material, for example files, the attachment of fixed pivot pins in the interior space of the transport car container proves a hindrance or, respectively, limits the capacity.

SUMMARY OF THE INVENTION

The object underlying the innovation resides in removing this hindrance caused by the pivot pins without negating the function of the optional removal of the container insert. This object is inventively achieved in that the seating locations are formed by means of recesses in the limiting walls and respectively accept a pivot pin formed by means of at least approximately horizontally extending outwardly bent end areas of the two arms of a U-shaped support bracket; and in that the container insert exhibits a slot at each side surface parallel to the limiting walls into which slot a respective arm of the support bracket engages.

Thus, the container insert is introduced into an essentially U-shaped support bracket whose two end areas are bent outwardly at right angles, are aligned with one another and are parallel to the wire section of the support bracket connecting the two arms of the support bracket. The two end areas of the support bracket can be snapped into the recesses without difficulty by means of pressing together the arms of the support bracket (against the resilience of the bracket resisting such inward deflection of the arms). The removal of the support bracket is just as simple since, upon pressing the arms of the support bracket together (against the action of the resilient restoring force resisting such inward deflection of the arms), the end areas are pulled out of the recesses, and, thus, the support bracket can be removed from the transport car container. In this conjunction, an advantageous further development of the innovation provides that clamps serving for the acceptance and retention of the support bracket are attached to a surface of the transport car container, which surface faces toward the outside. Thus, the support bracket can be clipped onto the exterior of the transport car container in those operating phases in which the transport car container carries no container insert and is immediately available at the moment when the transport car container is to be equipped with a container insert.

It is to be viewed as particularly favorable from the standpoint of production engineering that the recesses are designed as bores and the pivot pins bear a respective stop abutting against the edge area of the bore, said stop being located at a distance from the front face of the pivot pin which distance approximately corresponds to the wall thickness of the limiting walls. Thereby, the entire wall thickness of the transport car container is exploited as a seat for the end area of the support bracket and, thus, a relatively great security against undesired disengagement of the support bracket from the seating locations is given. The limitation of the seat toward the outside, i.e., the length of the end area of the bracket outside of the transport car container is determined by means of the stop in the end area, whereby this distance is preferably selected in such manner that the support bracket arms terminate with their respective end faces flush with the corresponding exterior surfaces of the transport car container.

The length of the arms of the U-shaped support bracket is essentially determined by the height dimension of the removable container insert or, respectively, by the distance of the center of gravity of the loaded container insert from the bottom surface of the container insert; care must be taken that the center of gravity of the container insert lies lower than the rotational axis of the support bracket since it is only by so doing that the defined upright orientation of the container insert can be guaranteed.

As regards the design of the container insert, it is to be viewed as advantageous that the slots are widened at least in the area neighboring the bottom surface of the container insert; this feature renders possible an easier introduction of the slot of the container insert into engagement with the support bracket. The introduction is optimally facilitated when the widening constantly increases in the direction toward the bottom surface; thus, the slot exhibits a triangular contour in the area neighboring the bottom surface, whereby the slot adapted to the support bracket begins at the peak of the triangle and leads up to the surface of the container insert which is opposite the bottom surface.

A further development of the innovative transport car container provides that the container insert exhibits a bow-shaped grip which is pivotal about an axis aligned perpendicular to both slots and is designed in the form of a fork below the pivot axis in at least one of the two bow arms, which fork embraces the corresponding arm of the U-shaped support bracket to prevent turning of the bow-shaped grip relative to the container insert during transport.

Such rotatable grips serve to facilitate the loading of the container insert or, respectively, make the complete loading possible in so far as container insert openings for the introduction of longer test tubes are provided directly below the central position of the grip. By means of the fork-shaped design of the end of the grip and by the exploitation of the support bracket for locking the grip, it is achieved that the grip remains upright in the transport car container and can be easily grasped in this position. A further advantage of the upright position of the grip in the container insert is to be seen in that the uniform weight distribution provided in standard rotatable container inserts by means of the provision of correspondingly distributed reception openings for test tubes and the position of the center of gravity thereby determined is retained and is not changed in the one or other direction by a grip folded down; thereby, a disruptive oblique position of the container insert which may arise under certain conditions can be prevented.

In the following, the innovation is described on the basis of an exemplary embodiment illustrated on the accompanying sheets of drawings; and other objects, features and advantages will be apparent from this detailed disclosure and from the appended claims.

BRIEF DESCRIPTION OF THE DRAWINGS

FIG. 3 is an overall somewhat diagrammatic side elevational view of a complete transport car assembly and indicating a container insert within the car container of the transport car assembly.

DETAILED DESCRIPTION

Figure 2:
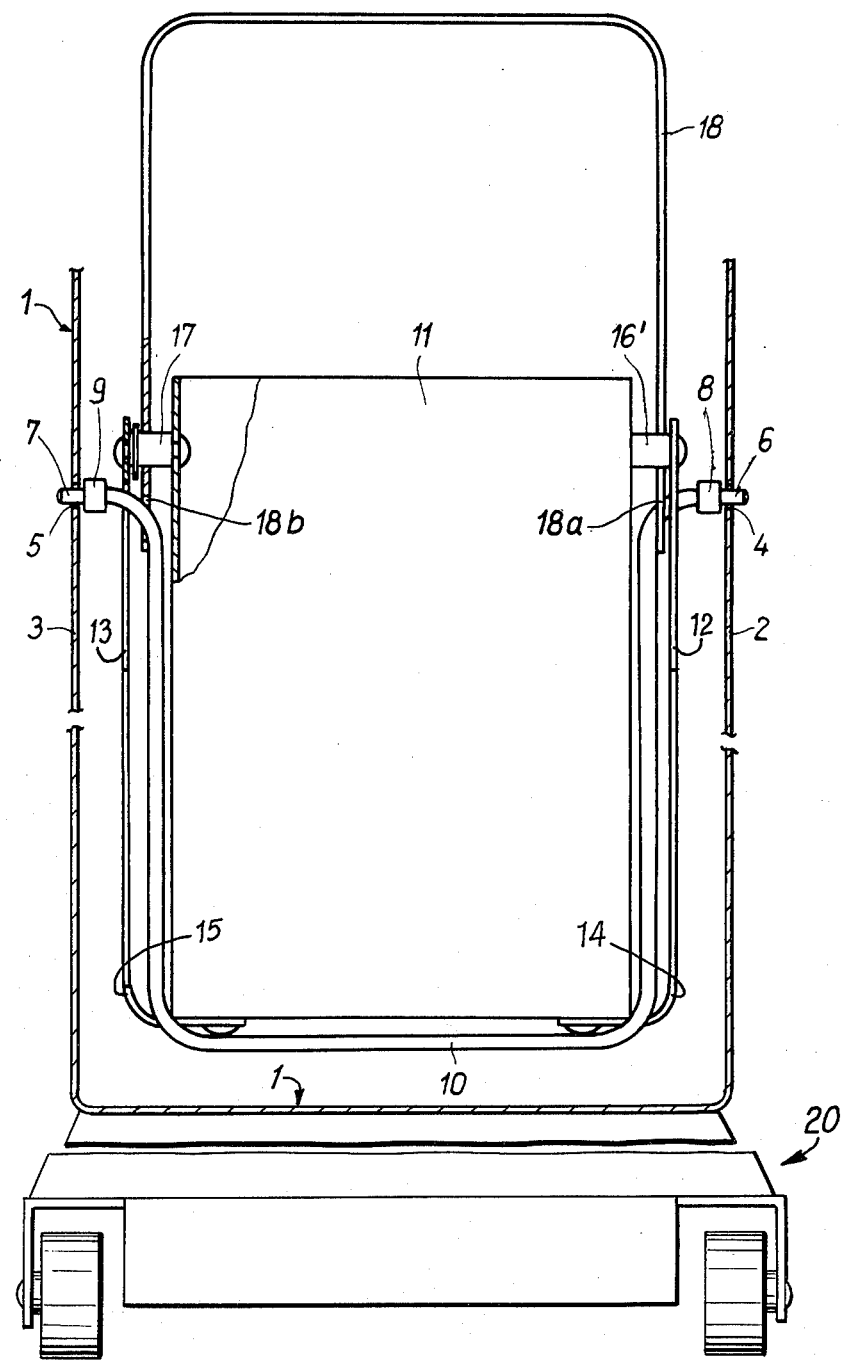
FIG. 2 is a somewhat diagrammatic view showing the container insert in front elevation with portions thereof broken away and shown in section to reveal details of construction, portions of the car container for receiving the container insert being indicated in section and being indicated diagrammatically as associated with the carriage of a transport car container.

The transport car container 1 exhibits two bores 4, 5, FIG. 2, at two limiting walls 2, 3 lying opposite one another, into which bores pivot pins 6, 7 are guided. The pivot pins 6, 7 are formed by the end areas of an essentially U-shaped support bracket 10, which end areas project beyond respective stops 8, 9.

The support bracket 10 is adapted to a container insert 11 in such manner that the arms of the support bracket engage in two slots 12, 13 of two guidance plates 14, 15 forming a structional part of the container insert 11 and, thus, prevent rotation of the container insert 11 relative to the support bracket 10.

Figure 1:
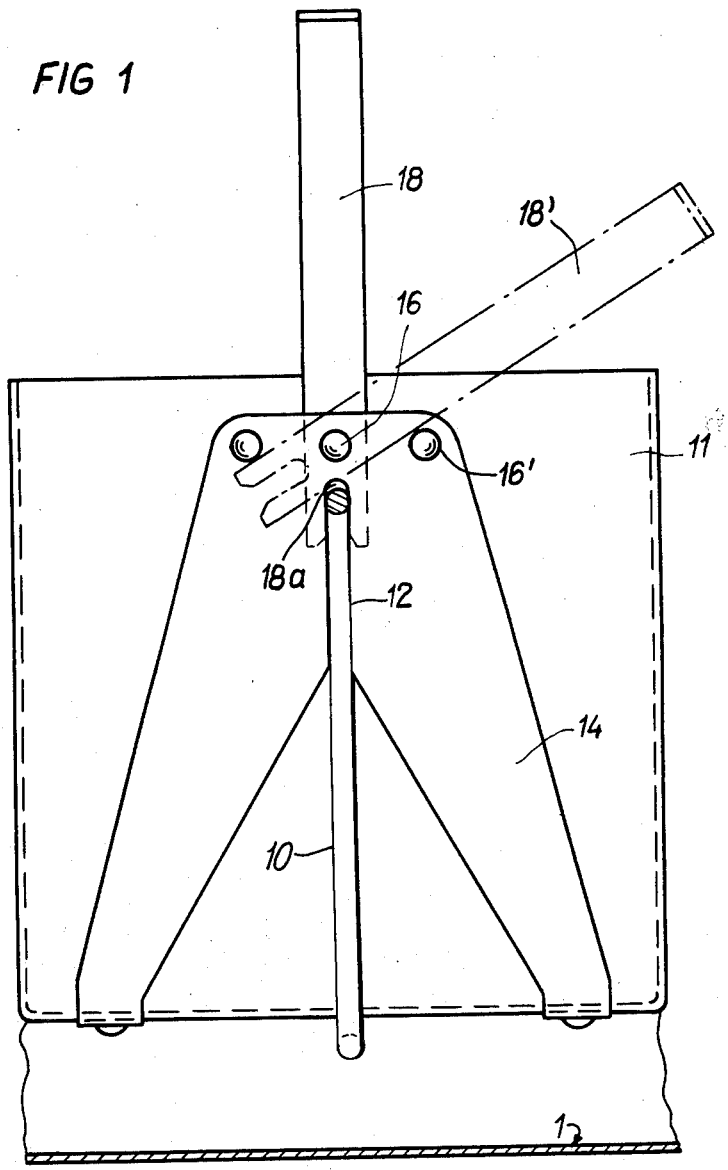
FIG. 1 is a somewhat diagrammatic view showing a container insert in side elevation and showing a portion of a transport car container for receiving the container insert, the bottom wall of the car container being shown in section.

The slots 12, 13 expand toward the bottom (see slot 12 in FIG. 1) and thus serve to facilitate the introduction of the container insert 11 into the transport car container 1.

In the upper area, the actual container insert 11 is connected with the guidance plates 14, 15 by two pins 16, 17 which at the same time represent the rotary seating for a grip 18 of the container insert 11. Additional pins such as 16' may serve as limit stops for limiting the pivotal movement of the grip 18 from the central upright position (see the folded position indicated at 18' in FIG. 1). The end of each arm of the carrying bow 18 projecting downwardly below the pins 16, 17 is bifurcated; the slots 18a and 18b, FIG. 2, formed by means of this design in the lower area of the grip 18 are engaged with the arms of the support bracket 10 when the container insert 11 is lowered into the transport car container 1 and thus effect a locking of the carrying bow 18 to the container insert 11 to secure the bow 18 against rotation relative to the container insert 11 during transport.

The support bracket 10 may lie in a single vertical plane as shown to facilitate its clamping flatwise to a flat external surface of the transport car container 1 when not in use. The length of the arms of bracket 10 is selected to insure that the center of gravity of the load carried by the container insert 11 will lie below the pivot axis provided by bracket end portions 6, 7, while also insuring that the top of grip 18 and the bottom section of support bracket 10 can execute a 360° rotation about the axis of end portions 6, 7 without striking any part of the interior of the transport car container 1. In FIGS. 2 and 3, reference numeral 20 designates the carriage of the transport car assembly with which the car container 1 is associated.

It will be apparent that many modifications and variations may be effected without departing from the scope of the novel concepts and teachings of the present invention.

I claim as my invention:

1. A transport car assembly comprising a transport car container (1) having two limiting walls (2, 3) lying opposite one another, a removable container insert (11) disposed within said car container (1) and between said two limiting walls, said two limiting walls (2, 3) having respective recesses (4, 5) which are aligned with each other for defining a pivot axis, a U-shaped support bracket (10) supporting the container insert (11) and having respective arms with outwardly bent end areas providing respective pivot pins (6, 7) inserted into the respective recesses (4, 5) so that the U-shaped support bracket (10) and the container insert (11) supported thereby are pivotally mounted within said car container (1) by means of said pivot pins (6, 7) for pivotal movement about said pivot axis relative to said car container (1), said container insert (11) having side members (14, 15) disposed parallel to said limiting walls (2, 3), and said side members (14, 15) having respective slots (12, 13) receiving the respective arms of said U-shaped support bracket (10) for releasably interengaging the container insert (11) with the U-shaped support bracket (10) so as to provide for joint pivotal movement relative to said car container (1) of the U-shaped support bracket (10) and the container insert (11) about said pivot axis.

2. A transport car assembly according to claim 1, the recesses (4, 5) being in the form of bores in said two limiting walls (2, 3) and the pivot pins (6, 7) provided by the end areas of the arms of the U-shaped bracket (10), each having a respective stop (8, 9) abutting against the edge area of the bores (4, 5), said stops each being arranged at a distance from the end face of the associated pivot pin which approximately corresponds to the wall thickness of the limiting walls (2, 3).

3. A transport car assembly according to claim 1, the U-shaped support bracket (10) having a base portion connecting the arms and engaging under the container insert (11) in supporting relation thereto, the slots (12, 13) being downwardly open so that the container insert

(11) can be lifted out of engagement with said U-shaped support bracket (10).

4. A transport car assembly according to claim 1, the container insert (11) having a bottom, the U-shaped support bracket (10) including a connecting base connecting the arms and underlying the bottom of the container insert (11), and the slots (12, 13) being widened at least in the area neighboring the bottom of the container insert (11).

5. A transport car assembly according to claim 4, with the slots (12, 13) having a widening which continuously increases in the direction toward the bottom of the container insert (11).

6. A transport car assembly according to claim 1, with the container insert (11) having a bow-shaped grip (18) including bow arms having a grip rotation axis (16, 17) aligned perpendicularly to both slots (12, 13), said grip (18) being rotatable about said grip rotation axis (16, 17) and having the form of a fork below the grip rotation axis (16, 17) at at least one of its two bow arms, said fork embracing the corresponding arm of the U-shaped support bracket (10) to prevent turning of the bow-shaped grip (18) relative to the container insert during transport.

7. A transport car assembly according to claim 6, the U-shaped support bracket (10) having a base portion connecting the arms and engaging under the container insert (11) in supporting relation thereto, the slots (12, 13) being downwardly open so that the container insert (11) can be lifted out of engagement with said U-shaped support bracket (10).

* * * * *